United States Patent
Kurasako et al.

[19]

[11] Patent Number: 6,135,245
[45] Date of Patent: Oct. 24, 2000

[54] DISC BRAKE SYSTEM

[75] Inventors: Ryoichi Kurasako, Gotenba; Hideyuki Inoue, Susono, both of Japan

[73] Assignee: Toyota Jidosha Kabushiki Kaisha, Toyota, Japan

[21] Appl. No.: 09/122,743

[22] Filed: Jul. 27, 1998

[30]     Foreign Application Priority Data

Aug. 22, 1997   [JP]   Japan ..................................... 9-226615

[51] Int. Cl.[7] .................................................. F16D 65/14
[52] U.S. Cl. .................. 188/73.45; 277/212 FB
[58] Field of Search .............................. 188/73.44, 73.45

[56]              References Cited

U.S. PATENT DOCUMENTS

| | | | |
|---|---|---|---|
| 4,265,341 | 5/1981 | Kuramoto | 188/73.44 |
| 4,279,331 | 7/1981 | Lüpertz . | |
| 4,753,326 | 6/1988 | Weiler et al. | 188/73.44 |
| 4,832,161 | 5/1989 | Weiler et al. | 188/73.44 |
| 5,161,651 | 11/1992 | Weiler et al. | 188/73.44 |
| 5,439,084 | 8/1995 | Vila Boluda | 188/73.44 |
| 5,526,904 | 6/1996 | Walden et al. | 188/73.44 |
| 5,593,006 | 1/1997 | Le Deit et al. | 188/73.44 |
| 5,785,156 | 7/1998 | Warwick et al. | 188/73.44 |

FOREIGN PATENT DOCUMENTS

| | | |
|---|---|---|
| 2931804 A1 | 2/1981 | Germany . |
| 57-144631 | 9/1982 | Japan . |
| 1457967 | 12/1976 | United Kingdom . |
| 1500907 | 2/1978 | United Kingdom . |
| 2151318 | 7/1985 | United Kingdom . |

*Primary Examiner*—Michael Mar
*Assistant Examiner*—Devon Kramer
*Attorney, Agent, or Firm*—Oliff & Berridge, PLC

[57]              ABSTRACT

A floating caliper disc brake system includes a caliper body housing a piston that presses a brake pad against a disc and a mount that slidably holds the caliper body in a direction perpendicular to the disc. The system further includes a slide pin that guides a sliding motion of the caliper body, which is connected to a pin securing portion provided for one side of the mount. A guide hole with which the slide pin is slidably engaged is formed in the other side of the mount. The slide pin is connected to the pin securing portion through an elastic bushing to decrease a slide pin guide clearance and substantially eliminate dragging.

10 Claims, 6 Drawing Sheets

DISC BRAKE SYSTEM

INCORPORATION BY REFERENCE

The disclosure of Japanese Patent Application Nos. HEI 9-226615 filed on Aug. 22, 1997 including the specification, drawings and abstract is incorporated herein by reference in its entirely.

BACKGROUND OF THE INVENTION

1. Field of the Invention

The present invention relates to a disc brake system of floating caliper type.

2. Description of Related Art

FIG. 7 shows a floating caliper disc brake system disclosed in Japanese Patent Utility Model 57-144631. Referring to FIG. 7, a disc 1 rotates integrally with a wheel and a mounting 2 (mount) which acts as a torque member is secured to a vehicle body. A caliper body 3 is also provided. The mounting 2 is provided with a pair of arms 2A, 2B across the disc, which are apart from each other in the peripheral direction of the disc 1.

The caliper body 3 is provided with an inner portion 3A and an outer portion 3B and disposed across an inner pad 4 and an outer pad 5 which interpose the disc 1. The inner portion 3A is provided with a cylinder 6 for slidably accommodating a piston 7 through a piston seal 8. The piston 7 presses the inner pad 4 against the disc 1.

The caliper body 3 has pin securing portions 10A, 10B which are disposed in a disk outlet portion (a portion from where the rotating disc is moved away from the pad) and a disk inlet portion (a portion from which the rotating disc is moved toward the pad). Base portions of slide pins 11, 12 disposed in parallel with a direction perpendicular to the disc 1 are connected to the pin securing portions 10A, 10B. An arrow P indicates a rotational direction of the disc 1 during forward movement of the vehicle. When the two slide pins 11, 12 are slidably inserted into guide holes 13, 14 formed in the arms 2A, 2B of the mounting 2 respectively, the caliper body 3 is supported in a floating state in a direction perpendicular to the disc 1.

In the foregoing case, a base portion of the slide pin 11 is firmly joined to the pin securing portion 10A at the disc outlet portion with a bolt. A pin engagement groove 16 having an opening facing the disc inlet portion is formed in the pin securing portion 10B at the disc inlet portion. The slide pin 12 is held by an elastic anchoring member 17 in a state where cylindrical base portion 12a of the slide pin 12 is fitted in the pin engagement groove 16. Thus, the slide pin 12 is allowed to be rotated only in the rotational direction of the disc.

In the above-structured disc brake system, when the inner pad 4 is pressed against the disc 1 by the piston 7, reaction force is generated so that the caliper body 3 is guided by the slide pins 11, 12 and the guide holes 13, 14 respectively for a sliding motion. Thus, the caliper body 3 presses the outer pad 5 against the disc 1 so as to interpose the disc 1 together with the inner pad 4, thus generating braking force. When the pressure applied by the piston 7 is released, the piston seal 8 serves to retract the caliper body 3 to an initial position.

In order to reliably obtain the braking force from the disc brake system having the slide pin type guide as described above, the slide pin is required to smoothly slide in the guide hole in the direction perpendicular to the disc. Therefore, the clearance between the slide pins and the guide holes has to be set to a relatively large value, allowing for the influence of machining tolerances and the like. However, the portion between the slide pins and the guide holes is likely to get warped during braking operation. As a result, the caliper body cannot easily be retracted to the initial position even after the pressure has been removed, resulting in dragging.

In order to overcome the above-described drawback, the disc brake system has a structure in which the slide pin 12 is connected to the pin securing portion 10B such that the slide pin 12 is allowed to move only in the rotational direction of the disc. However, the above-mentioned structure cannot sufficiently absorb the machining tolerances between the slide pins 11, 12 and the guide holes 13, 14 respectively. Therefore, the clearance between the slide pins and the guide holes has not been set to a substantially small value.

SUMMARY OF THE INVENTION

In view of the foregoing, an object of the present invention is to provide a disc brake system which is capable of setting a small clearance of a slide pin type guide so as to minimize causes of dragging.

To achieve the above-mentioned object, according to one aspect of the present invention, there is provided a floating caliper disc brake system incorporating a caliper body housing a piston for pressing a pad against a disc and a mounting for holding the caliper body slidably in a direction perpendicular to the disc. The disc brake system includes a structure in which a slide pin for guiding a sliding motion of the caliper body is connected to a pin securing portion provided for the caliper body, and a guide hole with which the slide pin is slidably engaged is formed in the mounting. In the disc brake system, the slide pin is connected to the pin securing portion through an elastic member.

The above-mentioned disc brake system is structured to support the slide pin through the elastic member that deforms for absorbing the machining tolerances. As a result, the clearance between the slide pin and the guide hole can be reduced to prevent the warp therebetween, thus substantially eliminating the dragging.

In this case, a groove may be formed in the inner peripheral surface of the elastic member to effectively improve the elastic force of the elastic member in the direction of the thickness thereof. A groove may also be formed on the outer peripheral surface of the elastic member to effectively improve the elastic force of the cylindrical portion.

According to another aspect of the present invention, there is provided a disc brake system in which an urging member for urging the caliper body in a direction opposite to a direction of movement during braking operation is disposed between the slide pin and the pin securing portion of the caliper body.

In this case, the urging member enables the caliper body to forcibly retract when the pressure has been removed. Thus, dragging can be further prevented.

Since the slide pin and the guide hole are disposed relatively, either the slide pin or the guide hole may be provided for the caliper body or the mounting. If the slide pin is connected to the mounting, the urging member may be interposed between the slide pin and the pin securing portion of the mounting.

These and other objects of the present invention will be described in or apparent from the following detailed description of preferred embodiments.

DETAILED DESCRIPTION OF PREFERRED EMBODIMENTS

Embodiments of the present invention will now be described with reference to the drawings.

Figure 1:
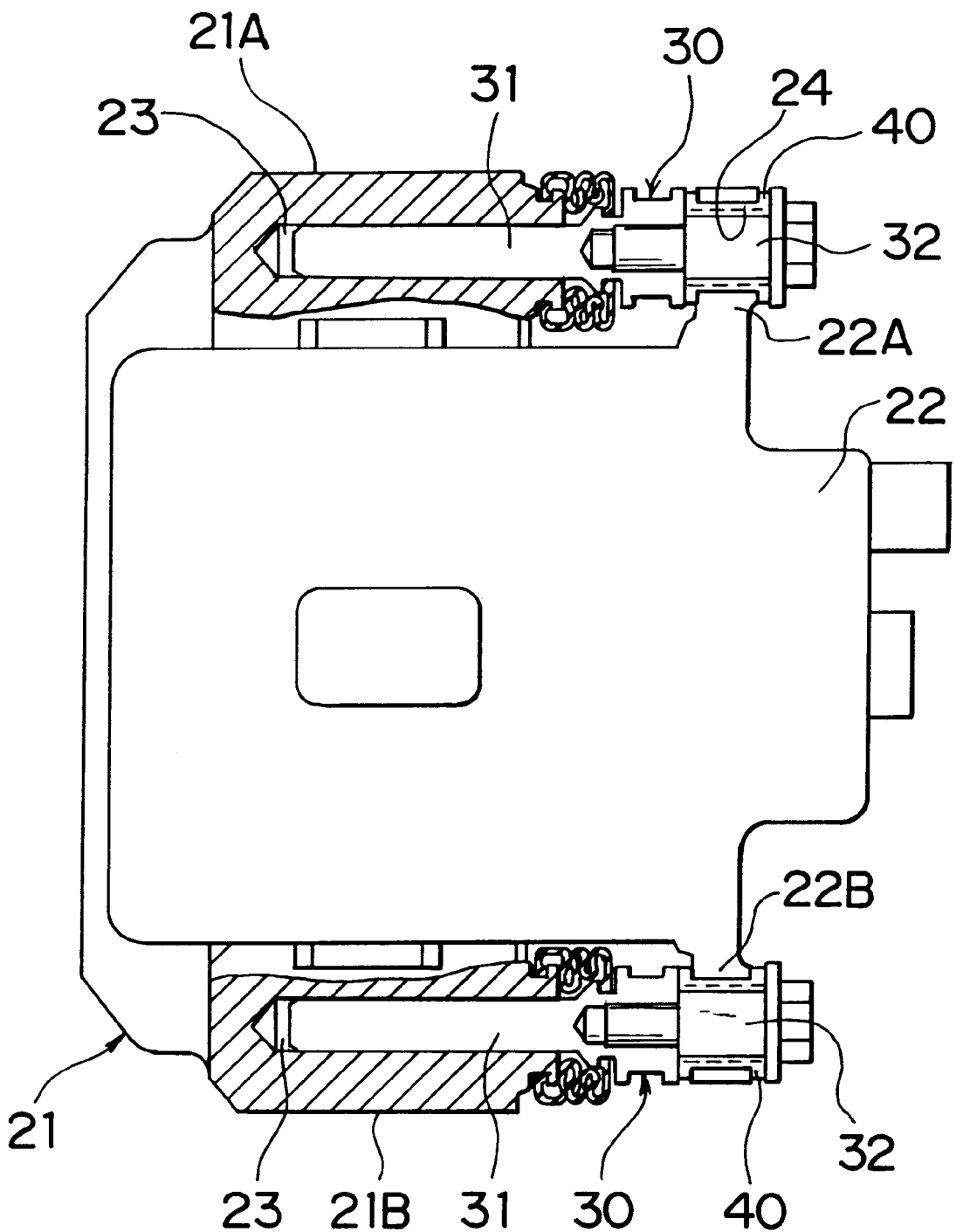
FIG. 1 is a plan view showing a partial cross section of a disc brake system according to a first embodiment and other embodiments of the present invention.
Figure 2:
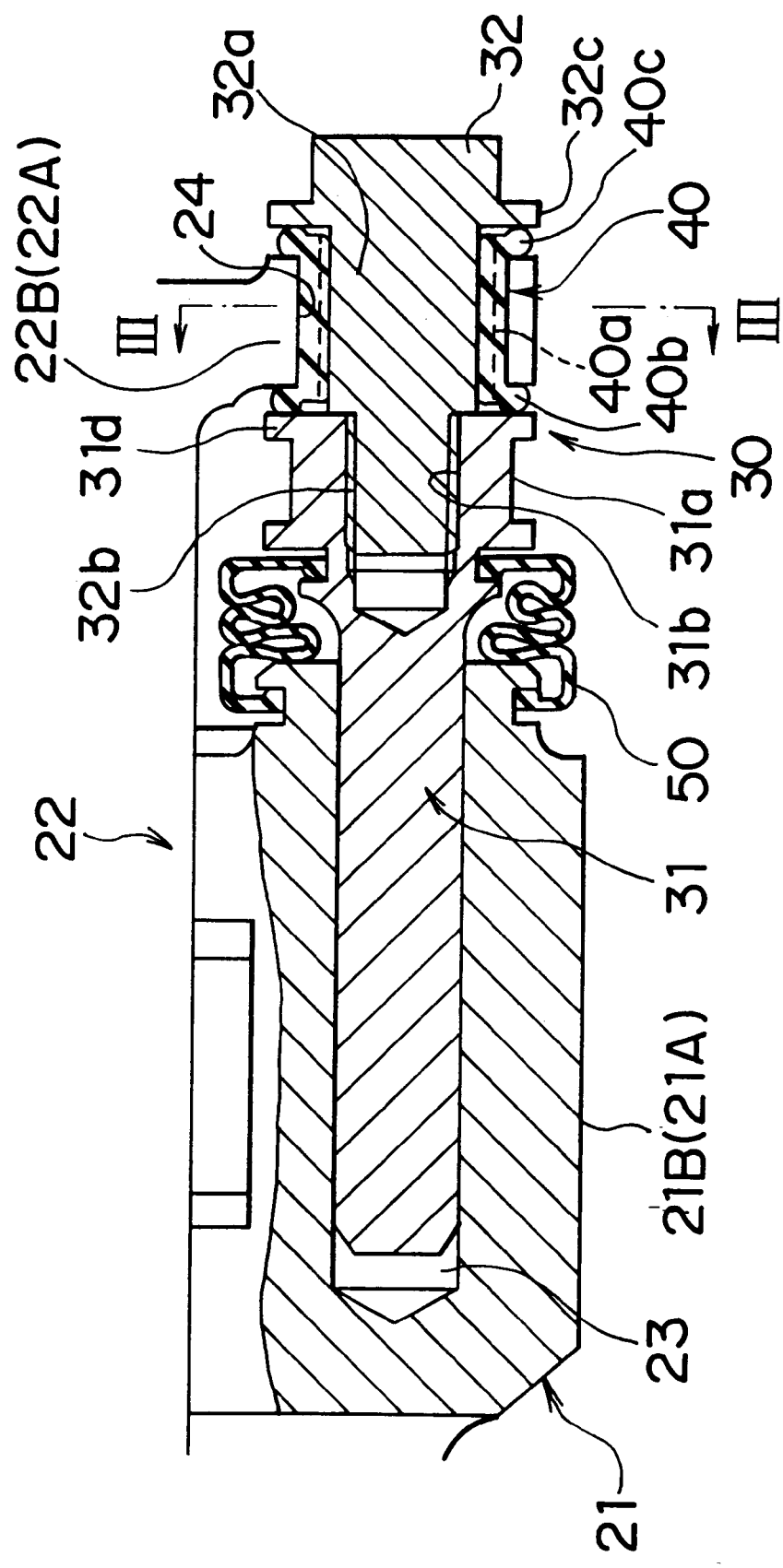
FIG. 2 is an enlarged view showing a portion as illustrated in FIG. 1.
Figure 3:
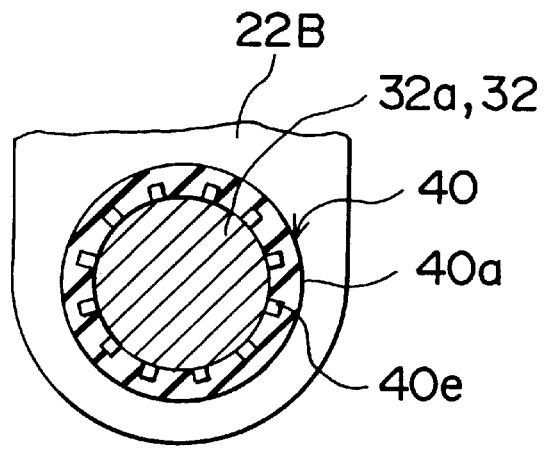
FIG. 3 is a cross sectional view taken along line III—III shown in FIG. 2.

FIG. 1 is a plan view showing a partial cross section of a disc brake system according to a first embodiment of the present invention. FIG. 2 is an enlarged view showing a portion of the disc brake system according to the first embodiment of the present invention. FIG. 3 is a cross sectional view taken along line III—III of FIG. 2.

As shown in FIG. 1, the disc brake system according to this embodiment has a structure in which a caliper body 22 housing a piston (not shown) is joined to a mounting (a torque member) 21 which is secured to a vehicle body such that the caliper body 22 is allowed to slide in a direction perpendicular to a disc (not shown). Moreover, a slide pin type guide for guiding a sliding motion is provided between arms 21A, 21B adjacent to the mounting 21 and pin securing portions 22A, 22B adjacent to the caliper body 22. This embodiment is characterized in that a slide pin 30, which is slidably inserted into a guide hole 23 of the arms 21A, 21B, is received and secured in a circular through hole 24 formed in the pin securing portions 22A, 22B through an elastic member such as elastic bushing 40 made of a rubber or the like. In this embodiment, the disc outlet portion (at the pin securing portion 22A) has the same structure as that of the disc inlet portion (at the pin securing portion 22B).

Referring to FIG. 2, the detailed structure of this embodiment will now be described. The slide pin 30 is formed of a cylindrical pin body 31 inserted into a guide hole 23 and a fixing bolt 32 screwed and secured in a thread hole 31b formed in an end surface of a base portion 31a of the pin body 31. The fixing bolt 32 is formed of a cylindrical shaft portion 32a having a leading end around which a thread portion 32b engaged with the thread hole 31b. Further, the fixing bolt 32 has a flange 32c formed at a boundary between the shaft portion 32a and a head portion of the fixing bolt 32.

The elastic bushing 40 is received to be fitted with an inner peripheral surface of the through hole 24 of the pin securing portions 22A, 22B. The elastic bushing 40 has a cylindrical portion 40a disposed in the through hole 24 and outer flanges 40b, 40c respectively formed at two ends of the cylindrical portion 40a to cover the end surfaces of the pin securing portions 22A, 22B. As shown in FIG. 3, a plurality of grooves 40e, extending axially and disposed apart from one another at a given interval in the peripheral direction, are formed in the inner peripheral surface of the elastic bushing 40 in order to improve elasticity in the thickness direction.

The slide pin 30 formed of the pin body 31 and the fixing bolt 32 is connected to each of the pin securing portions 22A, 22B through the elastic bushing 40. That is, the shaft portion 32a of the fixing bolt 32 penetrates a hole of the elastic bushing 40 received in the through hole 24 of the pin securing portions 22A, 22B. Moreover, the thread portion 32b formed at the leading end of the fixing bolt 32 is screwed into the thread hole 31b of the pin body 31. In this embodiment, outer flange 40b of elastic bushing 40 is interposed between a flange 31d of the base portion 31a of the pin body 31 and pin securing portions 22A, 22B. Outer flange 40c is interposed between pin securing portions 22A, 22B and flange 32c of fixing bolt 32. Thus, the slide pin 30 is elastically supported so as to be capable of moving in arbitrary directions as well as the radial direction. Note that a reference numeral 50 represents a boots member for preventing introduction of dust.

The disc brake system according to this embodiment is able to absorb machining tolerances of the pin securing portions 22A, 22B, the slide pin 30 and the like by elastic deformation of the elastic bushing 40. As a result, the necessity of enlarging the clearance between the slide pin 30 and the guide hole 23 to allow for the machining tolerances can be eliminated. Since the clearance can be reduced, the slide guiding operation can accurately be performed. Thus, warp between the slide pin and the guide hole caused by a braking operation can be prevented, resulting in reduced causes of dragging.

Since this embodiment has the structure in which a plurality of axially extending grooves 40e are formed on the inner peripheral surface of the elastic bushing 40, another advantage can be realized in that the shaft portion 32a of the fixing bolt 32 can be easily inserted into the elastic bushing 40.

Figure 4:
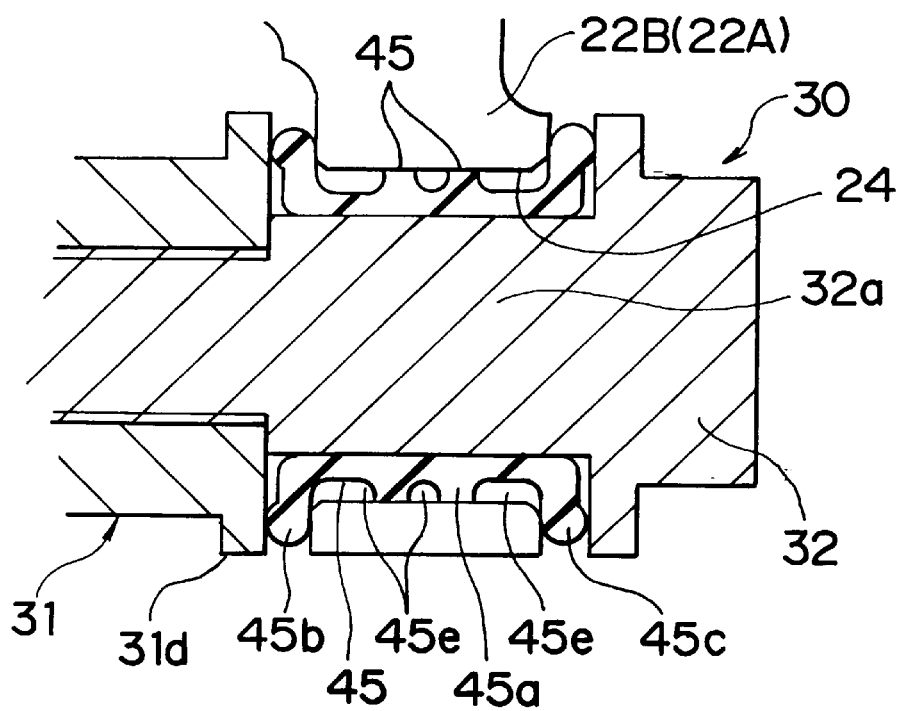
FIG. 4 is an enlarged view showing a portion of a disc brake system according to a second embodiment of the present invention.

A structure of a second embodiment as shown in FIG. 4 may be employed in which a plurality of annular grooves 45e, for example, are formed in the outer peripheral surface of a cylindrical portion 45a of an elastic bushing 45 having outer flanges 45b, 45c at both ends thereof. In this embodiment, only an annular projection 45f defined by the annular grooves 45e is brought into contact with the inner peripheral surface of the through hole 24 of the pin securing portions 22A, 22B. Therefore, the elastic bushing 45 can be easily deformed axially and radially in a diagonal direction. Therefore, machining tolerances in arbitrary directions can be effectively absorbed.

Figure 5:
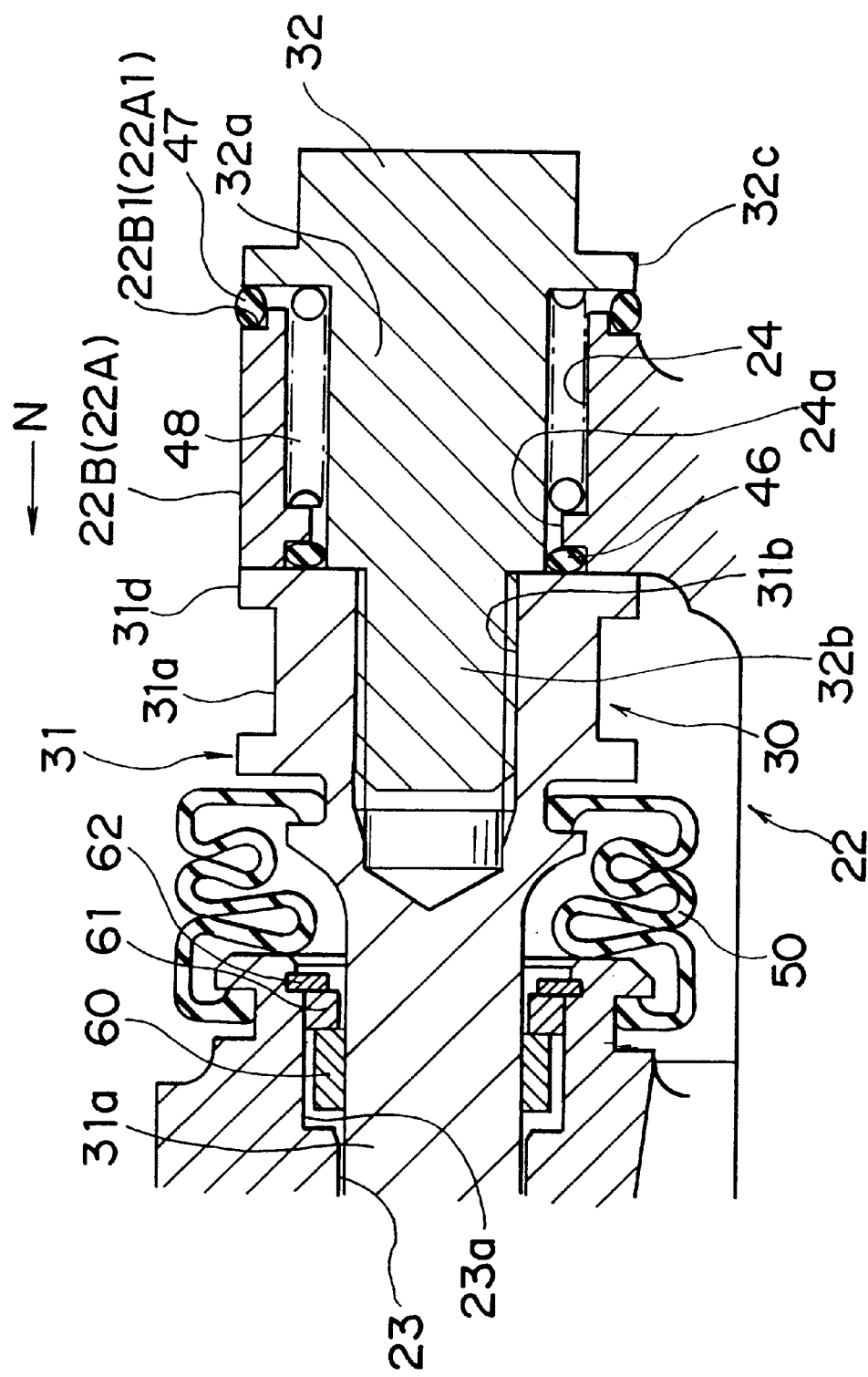
FIG. 5 is an enlarged view showing a portion of a disc brake system according to a third embodiment of the present invention.
Figure 6:
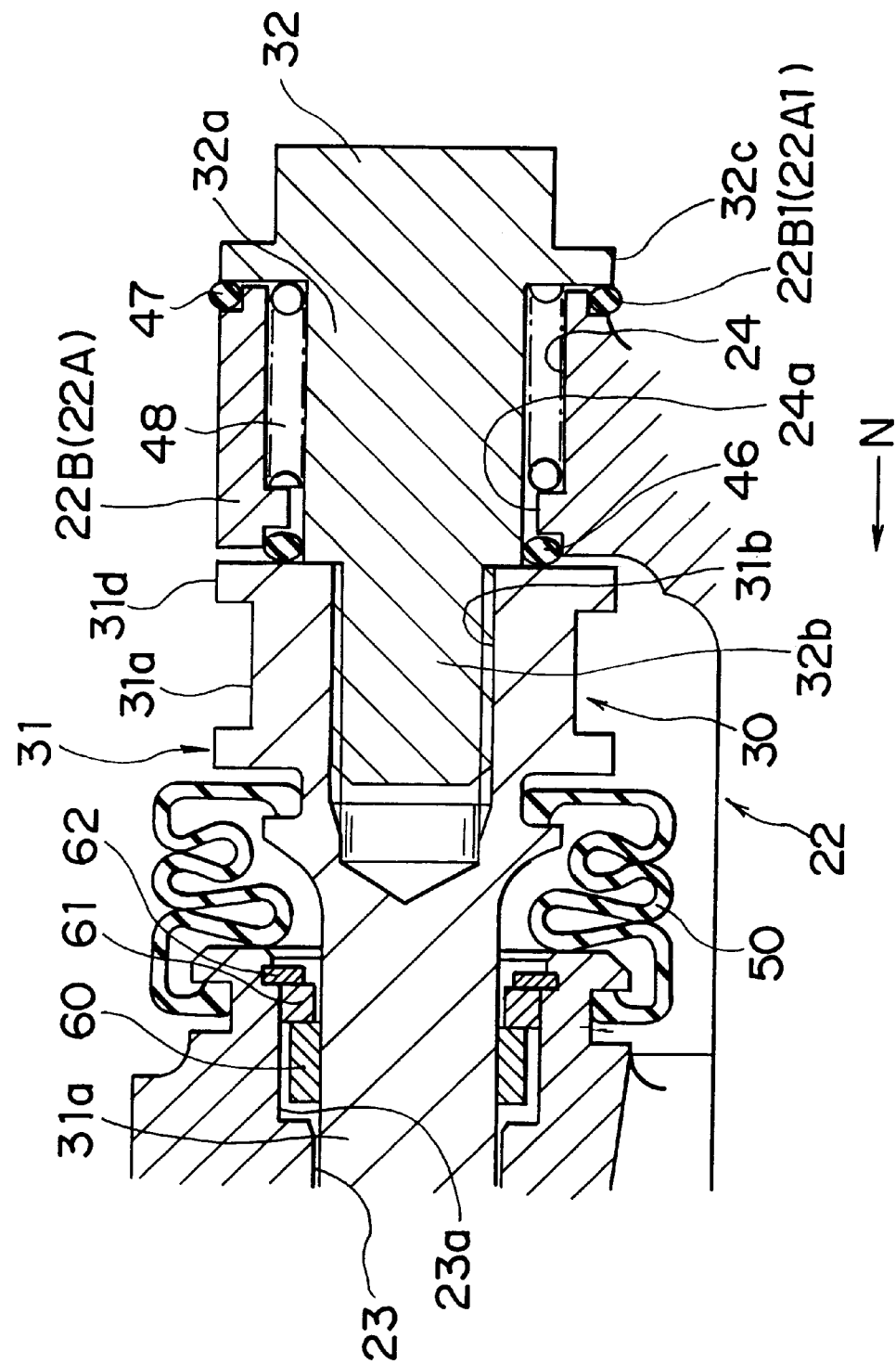
FIG. 6 is a cross sectional view showing a state of the structure of FIG. 5 during a braking operation.
Figure 7:
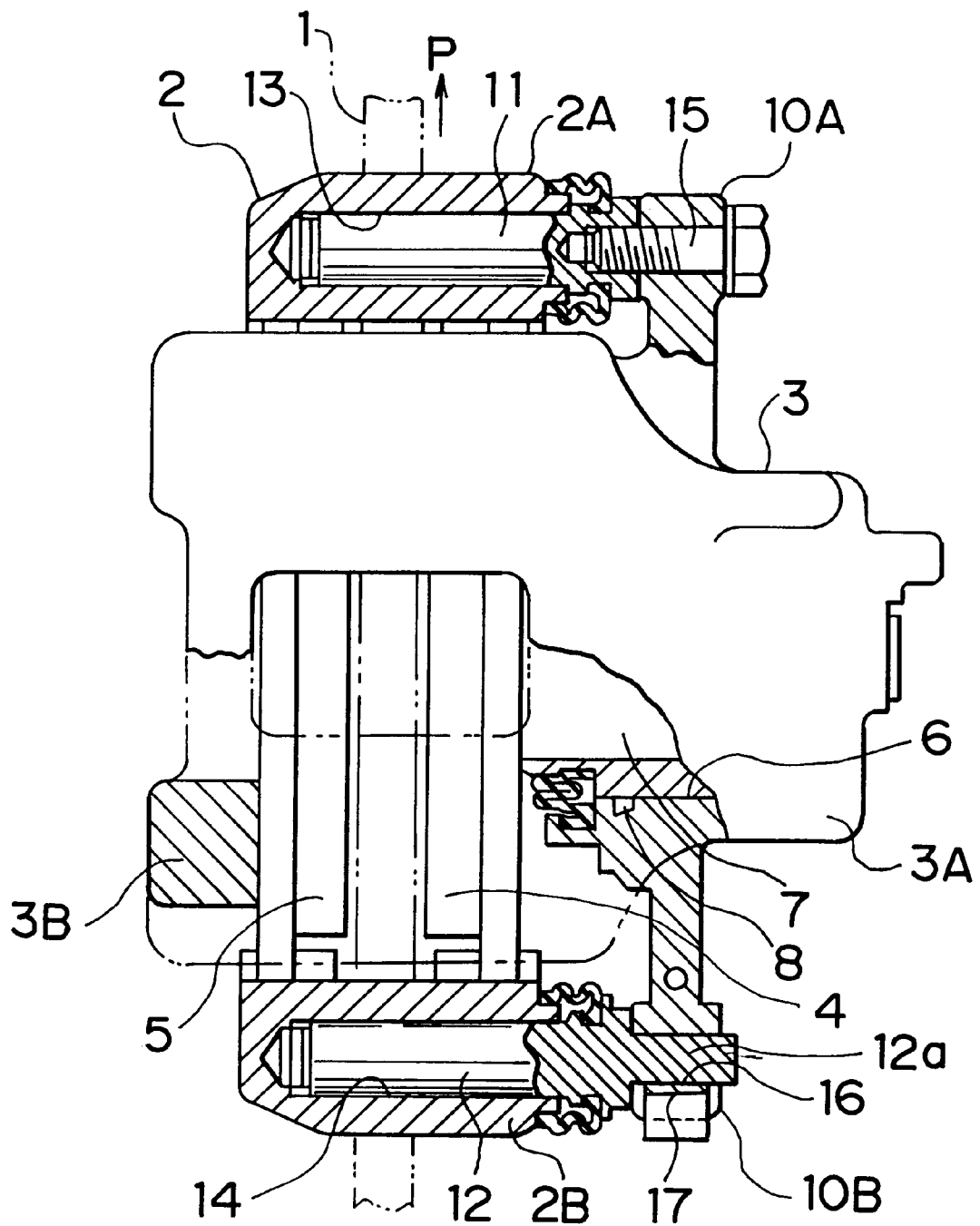
FIG. 7 is a plan view showing a partial cross section of a conventional disc brake system.

FIG. 5 is a diagram showing an essential portion of the structure of a disc brake system according to a third embodiment of the present invention. FIG. 6 is a diagram showing a state of the disc brake system during a braking operation.

The disc brake system according to the third embodiment has a structure in which the base portion of the slide pin 30 is connected to the pin securing portions 22A, 22B through two elastic members such as O-rings 46, 47 made of a rubber, in place of the elastic bushing. Moreover, an urging member such as spring 48 urges the caliper body 22 in a direction N opposite to the movement direction during a braking operation is disposed between the slide pin 30 and the pin securing portions 22A, 22B of the caliper body 22.

In this embodiment, the O-ring 46 is interposed between the flange 31d of the base portion 31a of the pin body 31 and a projection 24a of the through hole 24 of the pin securing portions 22A, 22B. The O-ring 46 is further interposed between the inner peripheral surface of the through hole 24 of the pin securing portions 22A, 22B and the outer peripheral surface of the shaft portion 32a of the fixing bolt 32. Meanwhile the O-ring 47 is interposed between the flange 32c of the fixing bolt 32 and end surfaces 22A1, 22B1 of the pin securing portions 22A, 22B. Thus, the base portion of the slide pin 30 is elastically supported so as to be moved in an arbitrary direction. The spring 48 is interposed between projection 24a formed on the inner peripheral surface of the through hole 24 of the pin securing portions 22A, 22B and the flange 32c of the fixing bolt 32. Thus, the spring 48 urges the pin securing portions 22A, 22B in the direction indicated by the arrow N with respect to the fixing bolt 32.

In addition to the above-mentioned structure, a friction ring 60 disposed in an annular recess 23a formed in an inlet portion of the guide hole 23 is joined around the pin body 31. The range in which the friction ring 60 is allowed to move is restrained by an O-ring 62 and a stopper 61. After the brake pad has worn down, the friction ring 60 is moved on the pin body 31 by a degree corresponding to the wear during braking operation so that a constant distance from the pad to the rotor is maintained during non-braking operation.

The disc brake system according to this embodiment has the structure in which the slide pin 30 is elastically supported by the caliper body 22 through two O-rings 46, 47. Therefore, the machining tolerances can be absorbed by the elastic deformations of the O-rings 46, 47, similar to the above-mentioned embodiments. Since the caliper body 22 is forcibly returned to the initial position by the force of the spring 48 after the pressure has been removed, dragging can be further prevented. Unlike a structure requiring additional space for accommodating the spring, in this embodiment, the spring 48 is accommodated in the through hole 24 of the pin securing portions 22A, 22B, thus requiring no further space. Since the spring 48 is accommodated in a sealed space having both ends closed by the two O-rings 46, 47, malfunction caused by introduction of dust can be prevented. Either one of the O-rings 46 and 47 may be omitted from the structure although the ability for absorbing the machining tolerances becomes slightly deteriorated.

Although each embodiment has the structure in which the slide pin 30 is secured to the caliper body 22 and the guide hole 23 is formed in the mounting 21, an inverse structure may be employed.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element or embodiment, are also within the spirit and scope of the invention.

What is claimed is:

1. A disc brake system comprising:
    a caliper body for pressing a pad against a disc;
    a mount that slidably holds said caliper body in a direction perpendicular to said disc;
    a pin securing portion provided for said caliper body;
    a slide pin connected to said pin securing portion that guides a sliding motion of said caliper body;
    a helical spring disposed between said slide pin and said pin securing portion of said caliper body that urges said caliper body in a direction opposite to a direction of movement during a braking operation; and
    a guide hole formed in said mount that allows said slide pin to be slidably engaged therewith,
    wherein said slide pin is connected to said pin securing portion through an elastic member.

2. A disc brake system according to claim 1, further comprising a friction ring disposed around an outer peripheral surface of said slide pin.

3. A disc brake system according to claim 1, wherein a groove is formed on an inner peripheral surface of said elastic member.

4. A disc brake system according to claim 1, wherein a groove is formed on an outer peripheral surface of said elastic member.

5. A disc brake system according to claim 1, wherein said elastic member comprises an O-ring.

6. A disc brake system comprising:
    a caliper body that presses a pad against a disc;
    a mount that slidably holds said caliper body in a direction perpendicular to said disc;
    a pin securing portion provided for said mount;
    a slide pin connected to said pin securing portion that guides a sliding motion of said caliper body;
    a helical spring disposed between said slide pin and said pin securing portion of said caliper body that urges said caliper body in a direction opposite to a direction of movement during a braking operation; and
    a guide hole formed in said caliper body that allows said slide pin to be slidably engaged therewith,
    wherein said slide pin is connected to said pin securing portion through an elastic member.

7. A disc brake system according to claim 6, further comprising a friction ring disposed around an outer peripheral surface of said slide pin.

8. A disc brake system according to claim 6, wherein a groove is formed on an inner peripheral surface of said elastic member.

9. A disc brake system according to claim 6, wherein a groove is formed on an outer peripheral surface of said elastic member.

10. A disc brake system according to claim 6, wherein said elastic member comprises an O-ring.

* * * * *